(12) United States Patent
Neubauer et al.

(10) Patent No.: US 11,841,003 B2
(45) Date of Patent: Dec. 12, 2023

(54) WIND TURBINE WITH A YAW SYSTEM

(71) Applicant: Vestas Wind Systems A/S, Aarhus N (DK)

(72) Inventors: Jesper Lykkegaard Neubauer, Hornslet (DK); Peter Bøttcher, Egå (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/783,025

(22) PCT Filed: Dec. 4, 2020

(86) PCT No.: PCT/DK2020/050345
§ 371 (c)(1),
(2) Date: Jun. 7, 2022

(87) PCT Pub. No.: WO2021/121496
PCT Pub. Date: Jun. 24, 2021

(65) Prior Publication Data
US 2023/0003189 A1 Jan. 5, 2023

(30) Foreign Application Priority Data
Dec. 20, 2019 (DK) .......................... PA 2019 70812

(51) Int. Cl.
*F03D 7/02* (2006.01)
*F03D 80/70* (2016.01)
*F03D 13/20* (2016.01)

(52) U.S. Cl.
CPC ........... *F03D 7/0204* (2013.01); *F03D 13/20* (2016.05); *F03D 80/70* (2016.05); *F05B 2260/4031* (2013.01); *F05B 2270/329* (2013.01)

(58) Field of Classification Search
CPC .... F03D 7/0204; F03D 7/0208; F03D 7/0212; F03D 80/70; F16C 2300/14; F16C 2360/31; F16C 17/10; F16C 17/107
See application file for complete search history.

(56) References Cited

U.S. PATENT DOCUMENTS

| 8,480,367 | B2 * | 7/2013 | Nielsen | F03D 13/20 |
| | | | | 416/246 |
| 10,781,797 | B2 * | 9/2020 | Sørensen | F16C 33/26 |

(Continued)

FOREIGN PATENT DOCUMENTS

| DE | 102004027992 A1 * | 1/2006 | ........... F03D 7/0204 |
| DE | 102009015957 A1 | 9/2010 | |

(Continued)

OTHER PUBLICATIONS

Danish Patent and Trademark Office, Search and Examination Report in PA 2019 70812, dated Oct. 13, 2020.

(Continued)

*Primary Examiner* — Justin D Seabe
(74) *Attorney, Agent, or Firm* — Wood Herron & Evans LLP (57) ABSTRACT

A wind turbine comprising a tower (2) with a tower wall and having at least one nacelle (3) mounted thereon, and a yaw system (1) interconnecting the tower (2) and at least one nacelle (3) is disclosed. The yaw system (1) comprises a yaw claw (4) comprising an upper radially extending part (5), a lower radially extending part (6) and an axially extending part (7) interconnecting the upper radially extending part (5) and the lower radially extending part (6), thereby defining a space. A sliding bearing connection with at least two axial sliding surfaces (9, 10) and at least one radial sliding surface (11) is arranged between the yaw claw (4) and a flange (8) arranged in the space defined by the yaw claw (4). At least one yaw drive (13) comprising a toothed gear (14) is (Continued)

arranged in meshing connection with a toothed yaw ring (12). The axially extending part (7) of the yaw claw (4) and the meshing connection between the toothed gear (14) and the toothed yaw ring (12) are arranged at the same side of the tower wall.

22 Claims, 9 Drawing Sheets

(56) References Cited

U.S. PATENT DOCUMENTS

| | | | |
|---|---|---|---|
| 11,092,140 B2* | 8/2021 | Canedo Pardo | ........ F16C 17/02 |
| 11,454,211 B2* | 9/2022 | Müller | .................... F03D 7/047 |
| 2019/0170115 A1 | 6/2019 | Mtauweg | |

FOREIGN PATENT DOCUMENTS

| | | | |
|---|---|---|---|
| EP | 1571334 A1 | 9/2005 | |
| EP | 2196668 A2 | 6/2010 | |
| EP | 2284395 A1 | 2/2011 | |
| EP | 2837818 A1 | 2/2015 | |
| EP | 3282122 A1 | 2/2018 | |
| KR | 20120019686 A | 3/2012 | |
| WO | 2008053017 A2 | 5/2008 | |
| WO | WO-2010098813 A1 * | 9/2010 | ............... F03D 1/02 |
| WO | 2017162250 A1 | 9/2017 | |

OTHER PUBLICATIONS

European Patent Office, International Search Report and Written Opinion in PCT Application No. PCT/DK2020/050345, dated Mar. 5, 2021.

\* cited by examiner

WIND TURBINE WITH A YAW SYSTEM

FIELD OF THE INVENTION

The present invention relates to a wind turbine comprising a tower with a tower wall and at least one nacelle mounted thereon. The wind turbine further comprises a yaw system interconnecting the tower and at least one nacelle. More particularly, in the wind turbine according to the invention, all parts of the yaw system can be accessed from one side of the tower wall.

BACKGROUND OF THE INVENTION

Wind turbines normally comprise a tower carrying one or more nacelles. A set of wind turbine blades is connected rotatably to each nacelle via a hub. Wind acting on the wind turbine blades thereby causes rotation of the hub, thereby transforming the energy of the wind into mechanical energy, which is subsequently transformed into electrical energy by means of a generator.

The nacelle(s) is/are mounted on the tower via a yaw system allowing the nacelle(s) to perform yawing movements relative to the tower about a substantially vertical axis. Thereby the wind turbine blades can be positioned correctly relative to the wind direction.

In the case that the wind turbine comprises only one nacelle, the yaw system may directly interconnect the tower and the nacelle. Alternatively, an intermediate piece may be positioned between the tower and the nacelle, in which case the yaw system may interconnect the tower and the intermediate piece or the intermediate piece and the nacelle. Wind turbines comprising only one nacelle, and thereby only one rotor, are sometimes referred to as 'single rotor wind turbines'.

In the case that the wind turbine comprises two or more nacelles, at least some of the nacelles may be mounted on the tower via a load carrying structure which carries two or more nacelles. In this case the yaw system may interconnect the tower and the load carrying structure. In this case the entire load carrying structure, with the nacelles mounted thereon, performs yawing movements relative to the tower, and the nacelles are thereby yawed in unison. As an alternative, a yaw system may be provided for interconnecting each of the nacelles and the load carrying structure. In this case each of the nacelles is yawed individually relative to the load carrying structure.

In prior art yaw systems the various parts of the yaw system, such as bearings, yaw drives, toothed yaw rings, etc., are normally positioned in such a manner that some of these parts need to be accessed from an inner side of the tower, and some of these parts need to be accessed from an outer side of the tower. Thereby maintenance, inspection, component replacement, etc. of the yaw system is difficult and time consuming. One example of such a wind turbine is disclosed in WO 2017/162250 A1.

DESCRIPTION OF THE INVENTION

It is an object of embodiments of the invention to provide a wind turbine with a yaw system in which maintenance, replacement and/or inspection of all parts of the yaw system can be performed in an easy manner.

It is a further object of embodiments of the invention to provide a wind turbine with a yaw system in which maintenance, replacement and/or inspection of all parts of the yaw system can be performed in a time efficient manner.

The invention provides a wind turbine comprising a tower with a tower wall and having at least one nacelle mounted thereon, and a yaw system interconnecting the tower and at least one nacelle, the yaw system comprising:

a yaw claw being fixedly connected to the tower or to a part forming part of or being connected to at least one nacelle, the yaw claw comprising an upper radially extending part, a lower radially extending part and an axially extending part interconnecting the upper radially extending part and the lower radially extending part, thereby defining a space delimited by the upper radially extending part, the lower radially extending part and the axially extending part, with an open end arranged opposite the axially extending part, a sliding bearing connection comprising at least two axial sliding surfaces and at least one radial sliding surface arranged between the yaw claw and a flange arranged in the space defined by the yaw claw, the flange forming part of the part forming part of or being connected to at least one nacelle, or the flange forming part of the tower, a toothed yaw ring, and at least one yaw drive comprising a toothed gear arranged in meshing connection with the toothed yaw ring, wherein the axially extending part of the yaw claw and the meshing connection between the toothed gear and the toothed yaw ring are arranged at the same side of the tower wall.

Thus, the invention provides a wind turbine comprising a tower with a tower wall and having at least one nacelle mounted thereon. Thus, in the present context the term 'tower' should be interpreted to mean a structure being attached to a foundation, and which extends along a substantially vertical direction, and which is configured to carry one or more nacelles. The tower wall forms a boundary of the tower, thereby defining an inner part of the tower as a space accommodated within the tower wall. The tower may, e.g., have a substantially cylindrical shape, or the tower may have a conical shape, or it may have a cylindrical-like shape defining a non-circular cross-section.

In the present context the term 'nacelle' should be interpreted to mean a structure which carries a rotating hub having a set of wind turbine blades mounted thereon. The nacelle may further define an inner space in which various components of the wind turbine, such as main shaft, gearbox, generator, electrical components, etc., may be accommodated.

The wind turbine further comprises a yaw system interconnecting the tower and at least one nacelle. Accordingly, the nacelle(s) can perform yawing movements relative to the tower, via the yaw system, as described above.

The yaw system comprises a yaw claw being fixedly connected to the tower or to a part forming part of or being connected to at least one nacelle. Thus, when the nacelle performs yawing movements relative to the tower, the yaw claw either remains fixed relative to the tower, in the case that the yaw claw is fixedly connected to the tower, or rotates along with the nacelle, in the case that the yaw claw is fixedly connected to the part forming part of or being connected to the nacelle. Examples of a part being connected to a nacelle is an intermediate piece or a load carrying structure, as described above. The yaw claw could, e.g., be fixedly connected directly to the nacelle, or even form part of the nacelle.

The yaw claw comprises an upper radially extending part, a lower radially extending part and an axially extending part interconnecting the upper radially extending part and the lower radially extending part. In the present context the term 'radially extending part' should be interpreted to mean a part which defines at least one surface which is arranged along a radial direction relative to the substantially cylindrical tower, i.e. in a direction extending from a centre axis of the tower towards the tower wall, substantially perpendicularly to the cylinder axis of the tower. Similarly, in the present context the term 'axially extending part' should be interpreted to mean a part which defines at least one surface which is arranged along an axial direction relative to the substantially cylindrical tower, i.e. in a direction which is parallel to the cylinder axis of the tower.

Thus, the upper radially extending part, the lower radially extending part and the axially extending part form an element with a substantially C-shaped or U-shaped cross section. Thereby a space is defined, which is limited by the upper radially extending part, the lower radially extending part and the axially extending part, with an open end arranged opposite the axially extending part.

The yaw system further comprises a sliding bearing connection comprising at least two axial sliding surfaces and at least one radial sliding surface. In the present context the term 'axial sliding surface' should be interpreted to mean a surface being configured to slide along another surface arranged adjacent thereto, the surfaces being arranged substantially perpendicularly to an axial direction of the tower. Similarly, in the present context the term 'radial sliding surface' should be interpreted to mean a surface being configured to slide along another surface arranged adjacent thereto, the surfaces being arranges substantially perpendicularly to a radial direction of the tower, i.e. substantially parallel to an axial direction of the tower.

The sliding surfaces are arranged between the yaw claw and a flange arranged in the space defined by the yaw claw, i.e. the space being delimited by the upper radially extending part, the lower radially extending part and the axially extending part. The flange may be received in the space defined by the yaw claw via the open end arranged opposite the axially extending part. Thereby the yaw claw clamps or encloses the flange.

The sliding surfaces may be formed on the radially and axially extending parts of the yaw claw, in which case the adjacent surfaces along which the sliding surfaces slide may be surfaces of the flange. As an alternative, the sliding surfaces may be formed on the flange, in which case the adjacent surfaces may be surfaces of the radially and axially extending parts of the yaw claw. As another alternative, some of the sliding surfaces may be formed on the yaw claw, and some of the sliding surfaces may be formed on the flange.

In any event, the yaw claw and the flange may perform movements relative to each other, via the sliding bearing connection and along the sliding surfaces.

The flange forms part of the part forming part of or being connected to at least one nacelle, or the flange forms part of the tower. More particularly, in the case that the yaw claw is fixedly connected to the tower, then the flange forms part of the part forming part of or being connected to at least one nacelle. For instance, the flange may be connected directly to the nacelle or even form part of the nacelle. Similarly, in the case that the yaw claw is fixedly connected to the part forming part of or being connected to at least one nacelle, then the flange forms part of the tower.

Thereby, when the yaw claw and the flange perform movements relative to each other, as described above, the tower and the part forming part of or being connected to at least one nacelle also perform movements relative to each other, and thereby the at least one nacelle is yawed.

The yaw system further comprises a toothed yaw ring and at least one yaw drive comprising a toothed gear arranged in meshing connection with the toothed yaw ring. Thereby operation of the yaw drive in order to rotate the toothed gear causes relative movements between the yaw drive and the toothed yaw ring. The toothed yaw ring may be fixedly connected to the tower, while the yaw drive is fixedly connected to the part forming part of or being connected to at least one nacelle, or vice versa. Thereby the relative movements between the yaw drive and the toothed yaw ring, caused by operating the yaw drive, results in yawing movements via the sliding bearing connection, as described above. The toothed gear may, e.g., be in the form of a pinion. The yaw ring may be toothed on an outer rim or on an inner rim.

The axially extending part of the yaw claw and the meshing connection between the toothed gear and the toothed yaw ring are arranged at the same side of the tower wall. Thereby at least the teeth of the yaw ring, the yaw drive, and the sliding bearing, including all sliding surfaces, can be accessed from the same side of the tower wall. Thereby maintenance, replacement and/or inspection of at least these parts can be performed in one go, and thereby in an easy, time efficient and cost efficient manner.

The sliding bearing connection and the meshing connection between the toothed gear and the toothed yaw ring may be arranged at axial levels being displaced relative to each other. For instance, the meshing connection between the toothed gear and the toothed yaw ring may be arranged either above or below all of the bearing surfaces of the sliding bearing. This allows the main load paths between the tower and the part forming part of or being connected to at least one nacelle to be positioned close to the tower wall. With the tower wall and the nacelle flange being positioned above each other, the vertical forces, mainly arising from gravitational loads, are transferred directly from the nacelle through the tower, while bending moments transferred between the two parts are transmitted via the yaw claws. Thereby undesired moments and eccentric loads in the structure are minimised.

As an alternative, the meshing connection between the toothed gear and the toothed yaw ring may be arranged substantially at an axial level of the sliding bearing connection, e.g. between the axial sliding surfaces or extending across one of the axial sliding surfaces.

The axially extending part of the yaw claw and the meshing connection between the toothed gear and the toothed yaw ring may be arranged at an inner side of the tower wall. According to this embodiment, at least the teeth of the yaw ring, the yaw drive, and the sliding bearing, including all sliding surfaces, can be accessed from the inside of the tower. Thereby it is not necessary to move outside the boundaries of the wind turbine in order to perform maintenance or inspection of these parts. This is particularly advantageous for offshore wind turbine, where personnel operating outside the wind turbine is difficult, and may even be hazardous.

The toothed yaw ring may be integrated in the yaw claw. For instance, the toothed yaw ring may form part of the upper radially extending part, the lower radially extending part or the axially extending part of the yaw claw. In this case, the toothed yaw ring may be formed on outer surfaces of one of these parts, i.e. surfaces which do not face the space defined by the yaw claw, and where the flange is positioned.

According to this embodiment, the toothed yaw ring is formed on another structural part of the wind turbine, i.e. on a part of the yaw claw, rather than being a separate part. Thereby the total number of required parts for the wind turbine is reduced, thereby reducing the manufacturing costs as well as the weight of the wind turbine. Furthermore, the number of interfaces, such as bolted connections, in the wind turbine is reduced. This may reduce the manufacturing costs as well as costs related to erecting the wind turbine.

As an alternative, the toothed yaw ring may be a separate part.

The wind turbine may comprise one nacelle, and the yaw system may interconnect the tower and the nacelle. According to this embodiment, the wind turbine is a single rotor wind turbine, and the nacelle is preferably arranged on top of the tower. In this case the yaw movements described above take place directly between the tower and the single nacelle.

As an alternative, the wind turbine may comprise at least two nacelles, and the yaw system may interconnect the tower and a load carrying structure carrying at least two nacelles. According to this embodiment, the wind turbine is a multirotor wind turbine, and at least two of the nacelles are mounted on the tower via the load carrying structure. The load carrying structure, with the nacelles mounted thereon, in this case perform the yawing movements described above relative to the tower.

The tower wall and a wall defined by the part forming part of or being connected to at least one nacelle may be arranged at substantially coinciding radial positions. According to this embodiment, the tower wall and the wall of the part forming part of or being connected to at least one nacelle are arranged flush relative to each other, i.e. the wall of the part forming part of or being connected to at least one nacelle is positioned directly above the tower wall, and therefore extends directly in continuation of the tower wall. Thereby loads transferred from the part forming part of or being connected to at least one nacelle are transferred directly to the tower.

The toothed yaw ring may be formed from two or more yaw ring segments. According to this embodiment, the toothed yaw ring has been assembled from two or more separately manufactured ring segments. The ring segments may be transported separately to the site of the wind turbine and assembled to form the toothed yaw ring at the site. This makes it easier to transport the toothed yaw ring.

As an alternative, the toothed yaw ring may be manufactured in a single piece.

The upper radially extending part or the lower radially extending part of the yaw claw may form an interface between the tower and the part forming part of or being connected to at least one nacelle. According to this embodiment, the upper radially extending part or the lower radially extending part is arranged between the tower and the part forming part of or being connected to at least one nacelle, and thereby acts as an 'adapter plate'. Thereby the yaw claw can be mounted on and pretensioned relative to the part forming part of or being connected to at least one nacelle, or to the tower, before the wind turbine is erected. For instance, this may be done already at a manufacturing site, and thereby under controlled conditions. This allows the wind turbine to be erected easier and faster.

A first axial sliding surface of the bearing connection and a second axial sliding surface of the bearing connection may be arranged at substantially coinciding radial positions, and at opposite sides of the flange arranged in the space defined by the yaw claw. According to this embodiment, the first axial sliding surface and the second axial sliding surface are positioned with one directly above the other, and are thereby displaced relative to each other in the axial direction, but not in the radial direction. This allows load paths between the part forming part of or being connected to the at least one nacelle and the tower to be positioned close to the tower wall.

BRIEF DESCRIPTION OF THE DRAWINGS

The invention will now be described in further detail with reference to the accompanying drawings in which.

DETAILED DESCRIPTION OF THE DRAWINGS

Figure 1:
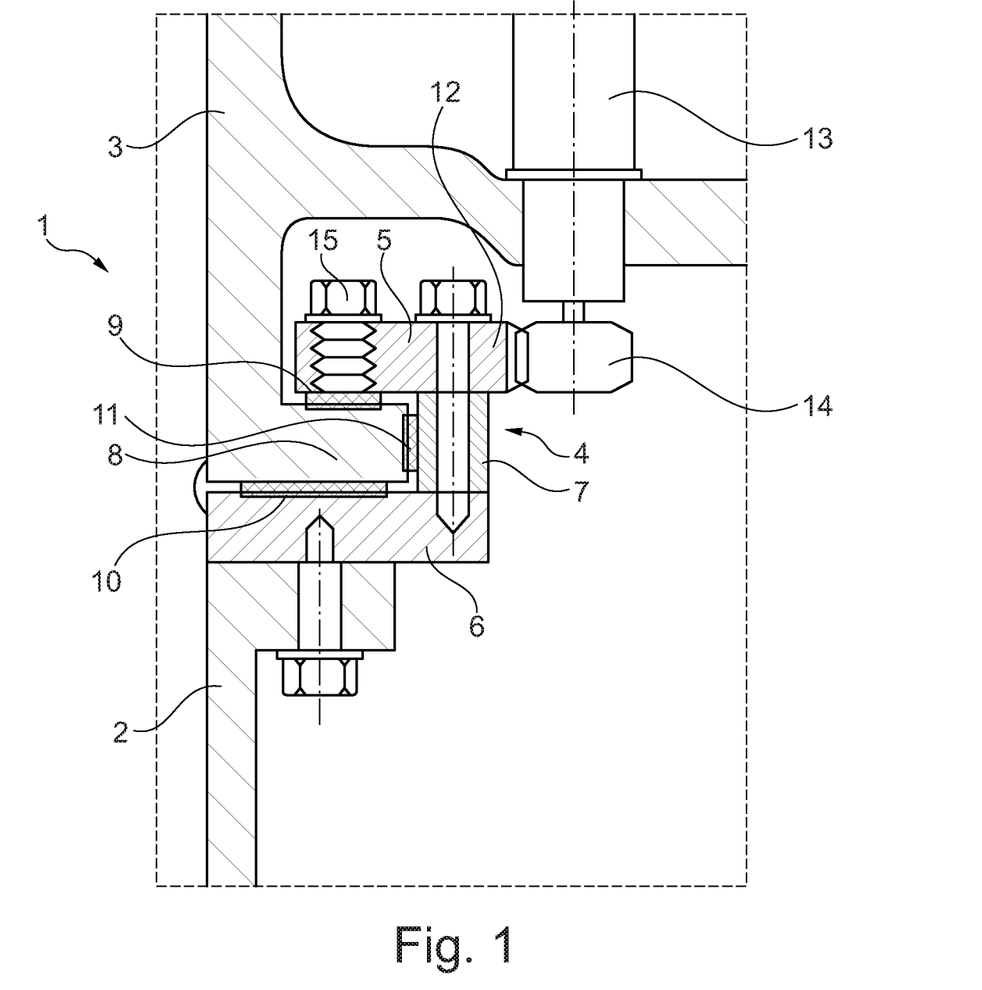
FIGS. 1-9 are cross sectional views of yaws systems for wind turbines according to nine different embodiments of the invention.

FIG. 1 is a cross sectional view of a yaw system 1 for a wind turbine according to a first embodiment of the invention. The wind turbine comprises a tower 2 with a nacelle 3 mounted thereon, via the yaw system 1.

The yaw system 1 comprises a yaw claw 4 with an upper radially extending part 5, a lower radially extending part 6 and an axially extending part 7 which interconnects the upper radially extending part 5 and the lower radially extending part 6. Thereby a space is defined which is delimited by the upper radially extending part 5, the lower radially extending part 6 and the axially extending part 7, and in which a flange 8 formed on the nacelle 3 is received. The yaw claw 4 is fixedly connected to the tower 2.

A first axial sliding surface 9, a second axial sliding surface 10 and a radial sliding surface 11 are positioned between the yaw claw 4 and the flange 8, thereby allowing the flange 8 to slide relative to the yaw claw 4.

The yaw system 1 further comprises a toothed yaw ring 12 forming part of the upper radially extending part 5 of the yaw claw 4. A yaw drive 13 is mounted on the nacelle 3 and comprises a toothed gear wheel 14 arranged in meshing connection with the toothed yaw ring 12. Accordingly, when the yaw drive 13 is operated to rotate the toothed gear wheel 14, the nacelle 3 is caused to rotate relative to the tower 2, i.e. to perform yawing movements.

The yaw claw 4, including the axially extending part 7 of the yaw claw 4, and the meshing connection between the toothed gear wheel 14 and the toothed yaw ring 12 are arranged at an inner side of the tower wall 2. Thereby the toothed yaw ring 12, the yaw drive 13, including the toothed gear wheel 14, the yaw claw 4 and all the sliding surfaces 9, 10, 11 can be accessed from the inside of the tower 2. This makes it easy and fast to perform maintenance or inspection of these parts.

Furthermore, the meshing connection between the toothed gear wheel 14 and the toothed yaw ring 12 is arranged above all of the sliding surfaces 9, 10, 11.

The lower radially extending part 6 of the yaw claw 4 forms an interface between the tower 2 and the nacelle 3, i.e. it is arranged between these. A tensioning mechanism 15 is mounted on the upper radially extending part 5 of the yaw claw 4, in order to allow pretension of the yaw system 1.

Figure 2:
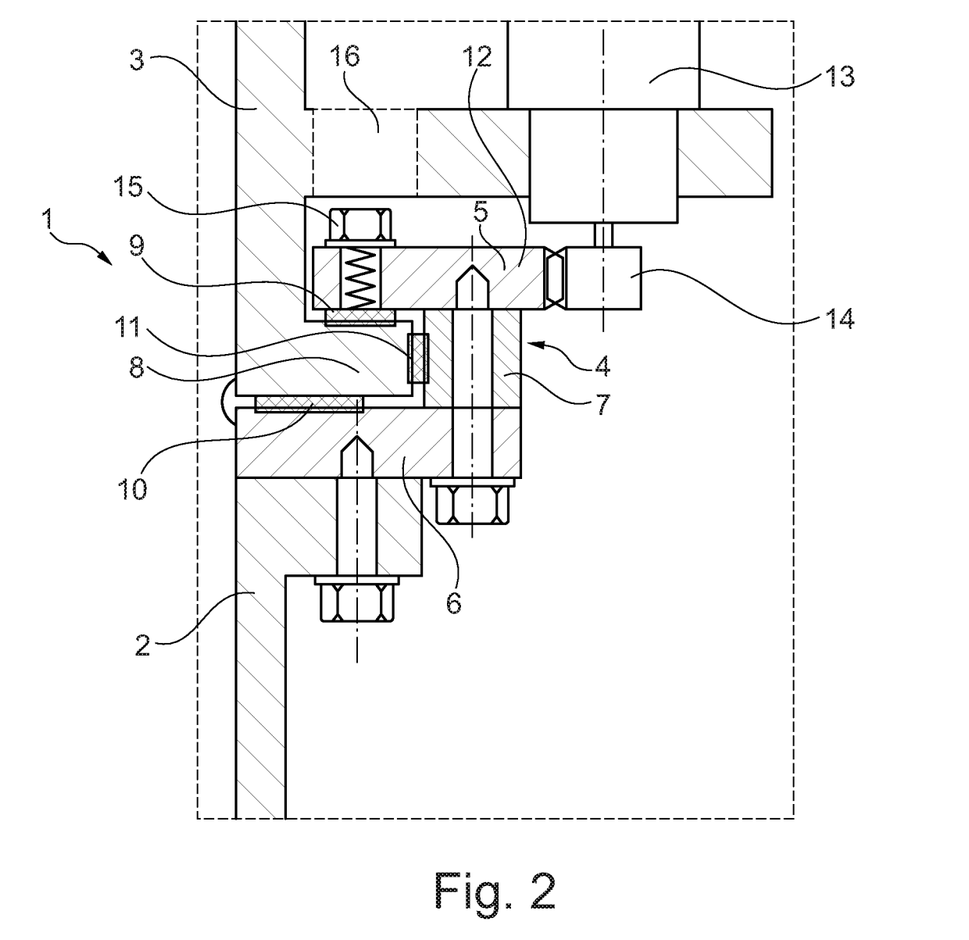

FIG. 2 is a cross sectional view of a yaw system 1 for a wind turbine according to a second embodiment of the invention. The yaw system 1 of FIG. 2 is very similar to the yaw system 1 of FIG. 1, and it will therefore not be described in detail here. However, in the yaw system 1 of FIG. 2, an opening 16 is formed in the part of the nacelle 3 which carries the yaw drive 13, in order to provide access to the upper radially extending part 5 of the yaw claw 4, to the sliding surfaces 9, 11, to the tensioning mechanism 15, etc., from above. The access through the opening 16 may, e.g., be for maintenance, replacement and/or inspection purposes. It should be noted that the opening 16 is not formed along the entire circumference of the nacelle 3, and if a similar cross section was made at another position, the opening 16 might not be visible.

Figure 3:
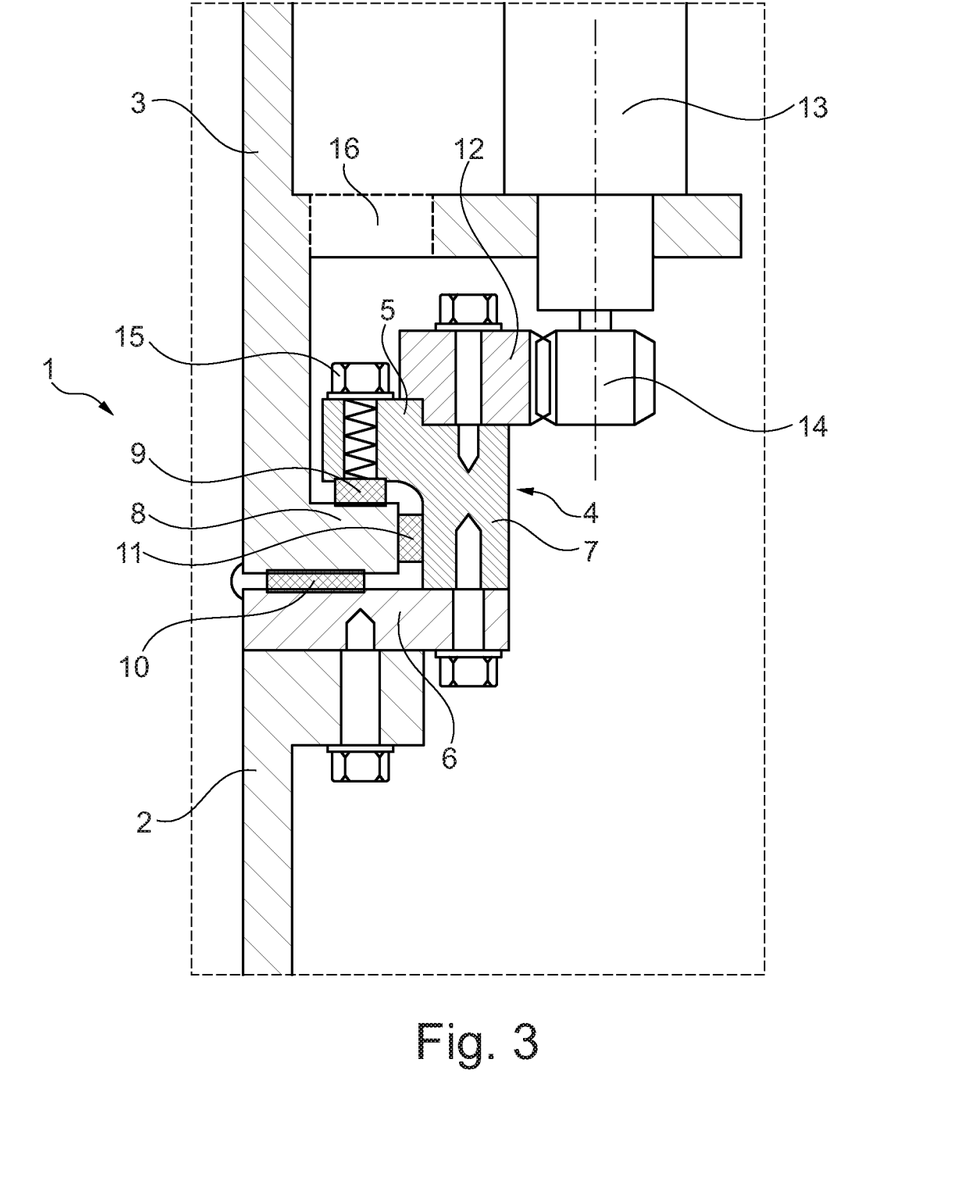

FIG. 3 is a cross sectional view of a yaw system 1 for a wind turbine according to a third embodiment of the invention. The yaw system 1 of FIG. 3 is very similar to the yaw systems 1 of FIGS. 1 and 2, and it will therefore not be described in detail here. However, in the yaw system 1 of FIG. 3, the toothed yaw ring 12 is a separate part which is mounted on the upper radially extending part 5 of the yaw claw 4.

Figure 4:
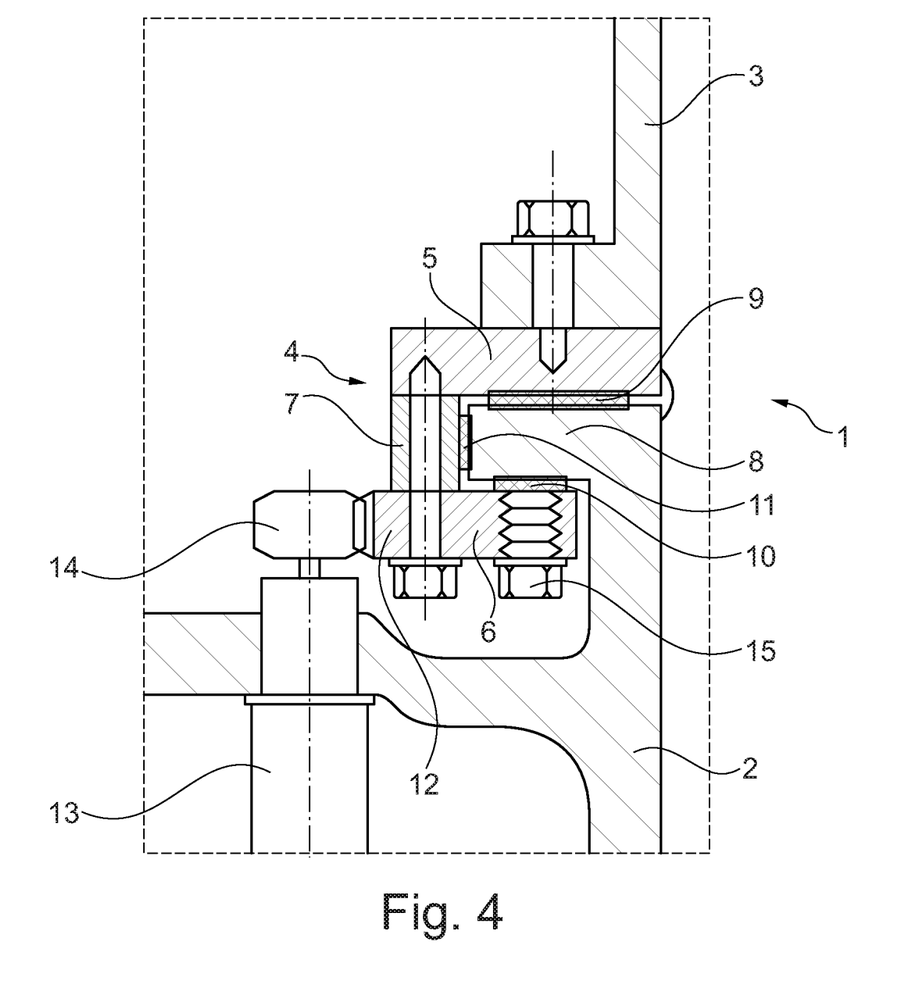

FIG. 4 is a cross sectional view of a yaw system 1 for a wind turbine according to a fourth embodiment of the invention. The yaw system 1 of FIG. 4 is very similar to the yaw system 1 of FIG. 1, and it will therefore not be described in detail here. However, in the yaw system 1 of FIG. 4, the yaw claw 4 is fixedly connected to the nacelle 3, and the flange 8 forms part of the tower 2. Furthermore, the yaw drive 13 is mounted on the tower 2.

Figure 5:
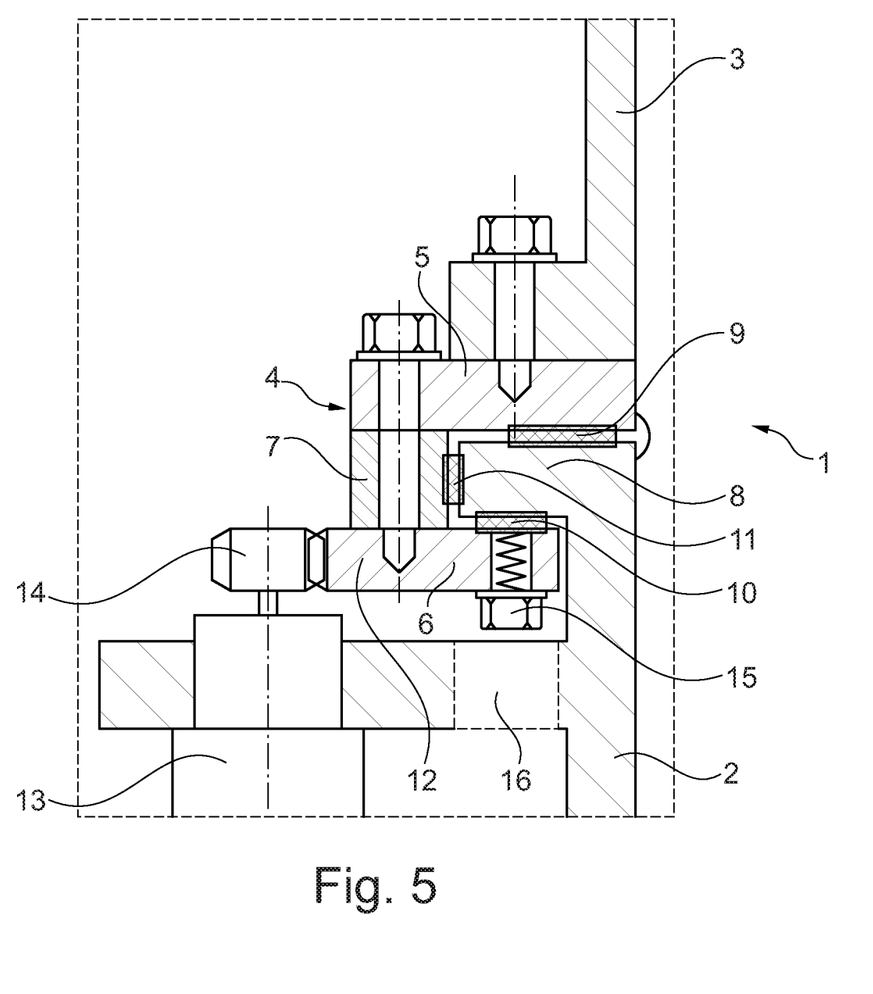

FIG. 5 is a cross sectional view of a yaw system 1 for a wind turbine according to a fifth embodiment of the invention. The yaw system 1 of FIG. 5 is very similar to the yaw system 1 of FIG. 4, in the sense that the yaw claw 4 is fixedly connected to the nacelle 3, and the flange 8 forms part of the tower 2. Furthermore, the yaw system 1 of FIG. 5 is very similar to the yaw system 1 of FIG. 2, in the sense that it is provided with an opening 16 formed in the part of the tower 2 which carries the yaw drive 13. However, in the embodiment of FIG. 5, the opening 16 provides access to various parts from below rather than from above.

Figure 6:
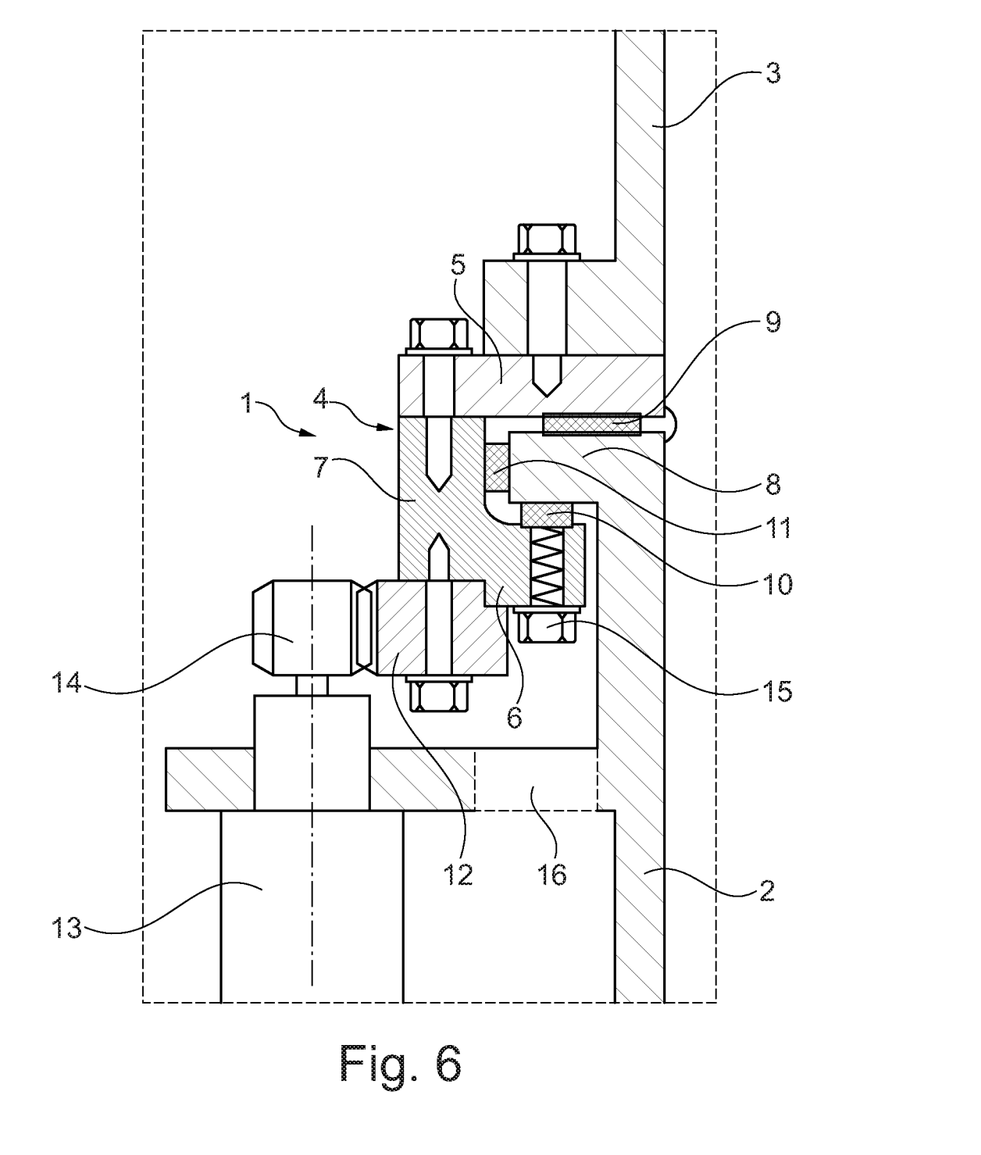

FIG. 6 is a cross sectional view of a yaw system 1 for a wind turbine according to a sixth embodiment of the invention. The yaw system 1 of FIG. 6 is very similar to the yaw systems 1 of FIGS. 4 and 5, in the sense that the yaw claw 4 is fixedly connected to the nacelle 3, and the flange 8 forms part of the tower 2. Furthermore, the yaw system 1 of FIG. 6 is very similar to the yaw system 1 of FIG. 3, in the sense that the toothed yaw ring 12 is a separate part which is mounted on the lower radially extending part 6 of the yaw claw 4.

Figure 7:
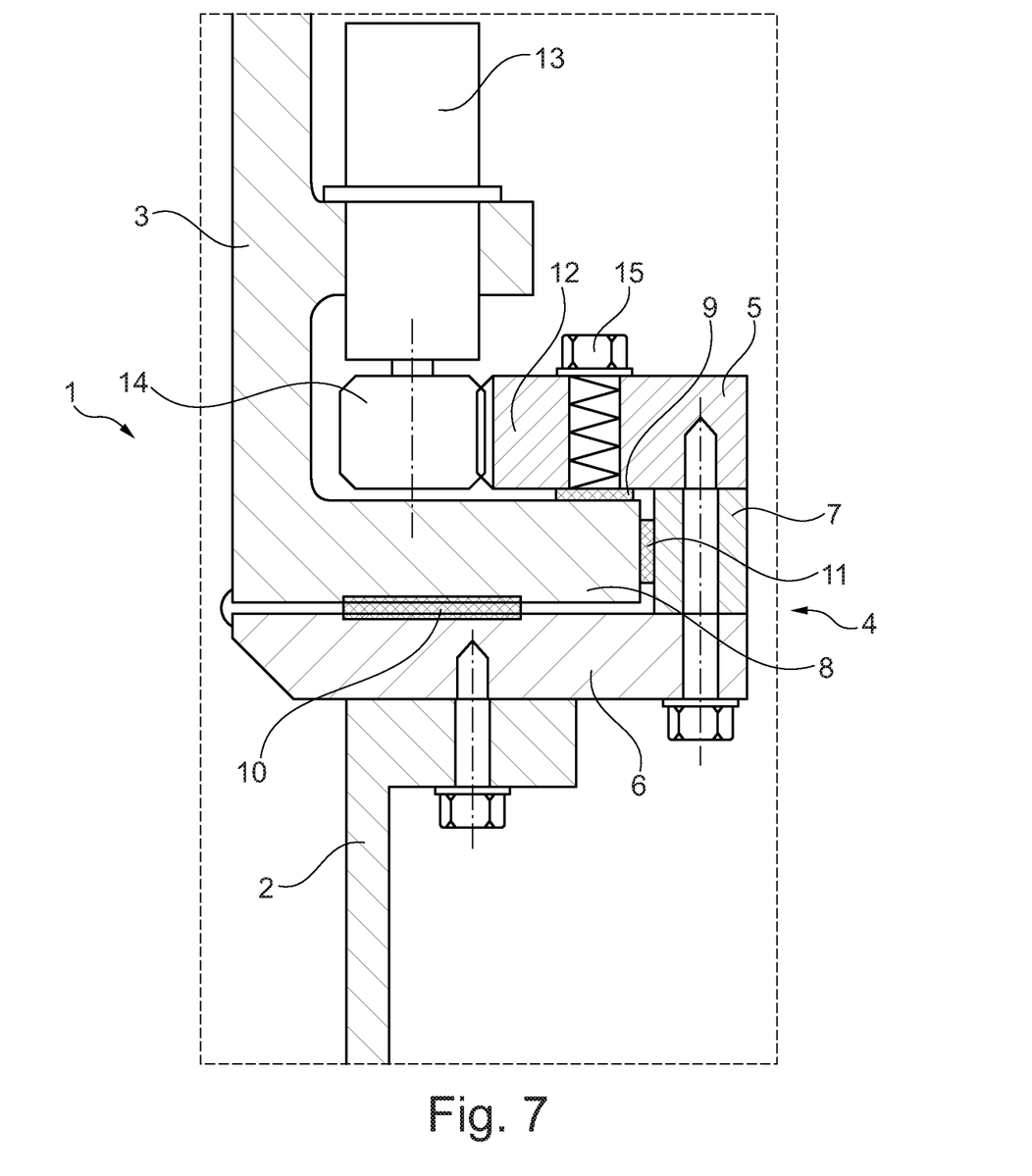

FIG. 7 is a cross sectional view of a yaw system 1 for a wind turbine according to a seventh embodiment of the invention. The yaw system 1 of FIG. 7 is very similar to the yaw system 1 of FIG. 1, and it will therefore not be described in further detail here. However, in the yaw system 1 of FIG. 7, the toothed yaw ring 12 is toothed on an outer rim, rather than on an inner rim. Therefore, the meshing connection between the toothed gear 14 and the toothed yaw ring 12 is positioned between the wall of the nacelle 3 and the yaw claw 4.

Figure 8:
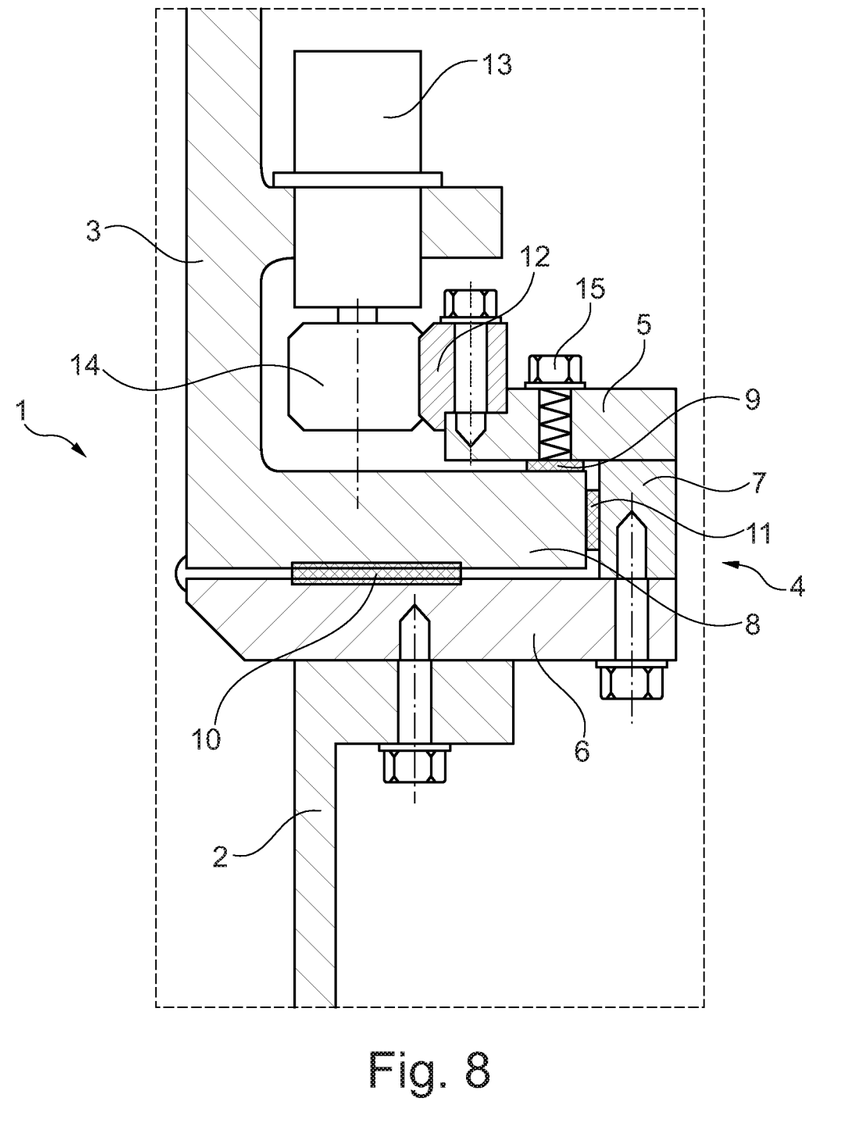

FIG. 8 is a cross sectional view of a yaw system 1 for a wind turbine according to an eighth embodiment of the invention. The yaw system 1 of FIG. 8 is very similar to the yaw system 1 of FIG. 7, in the sense that the toothed yaw ring 12 is toothed on an outer rim, and that the meshing connection between the toothed gear 14 and the toothed yaw ring 12 is positioned between the wall of the nacelle 3 and the yaw claw 4. Furthermore, the yaw system 1 of FIG. 8 is very similar to the yaw system 1 of FIG. 3, in the sense that the toothed yaw ring 12 is a separate part which is mounted on the upper radially extending part 5 of the yaw claw 4.

Figure 9:
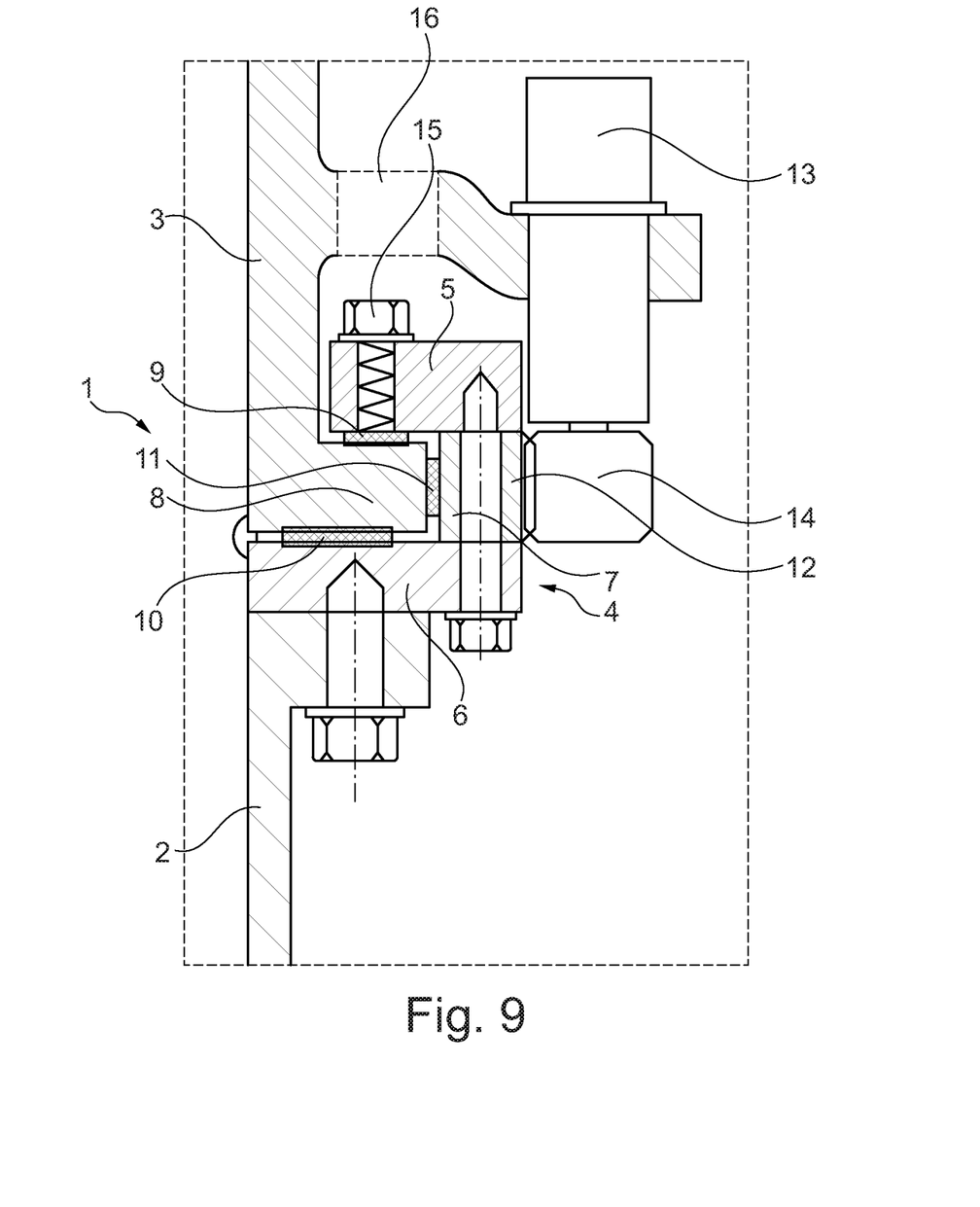

FIG. 9 is a cross sectional view of a yaw system 1 for a wind turbine according to a ninth embodiment of the invention. The yaw system 1 of FIG. 9 is very similar to the yaw system 1 of FIG. 2, in the sense that it is provided with an opening 16 formed in the part of the nacelle 3 which carries the yaw drive 13. However, in the yaw system 1 of FIG. 9, the toothed yaw ring 12 forms part of the axially extending part 7 of the yaw claw 4, rather than forming part of the upper radially extending part 5 of the yaw claw 4.

The invention claimed is:

1. A wind turbine comprising a tower with a tower wall and having at least one nacelle mounted thereon, and a yaw system interconnecting the tower and at least one nacelle, the yaw system comprising:
    a yaw claw being fixedly connected to the tower or to a part forming part of or being connected to at least one nacelle, the yaw claw comprising an upper radially extending part, a lower radially extending part and an axially extending part interconnecting the upper radially extending part and the lower radially extending part, thereby defining a space delimited by the upper radially extending part, the lower radially extending part and the axially extending part, with an open end arranged opposite the axially extending part;
    a sliding bearing connection comprising at least two axial sliding surfaces and at least one radial sliding surface arranged between the yaw claw and a flange arranged in the space defined by the yaw claw, the flange forming part of the part forming part of or being connected to at least one nacelle, or the flange forming part of the tower;
    a toothed yaw ring fixedly attached to the yaw claw such that the yaw claw carries the toothed yaw ring; and
    at least one yaw drive comprising a toothed gear arranged in meshing connection with the toothed yaw ring,
    wherein the axially extending part of the yaw claw and the meshing connection between the toothed gear and the toothed yaw ring are arranged at the same side of the tower wall.

2. The wind turbine according to claim 1, wherein the sliding bearing connection and the meshing connection between the toothed gear and the toothed yaw ring are arranged at axial levels being displaced relative to each other.

3. The wind turbine according to claim 1, wherein the axially extending part of the yaw claw and the meshing connection between the toothed gear and the toothed yaw ring are arranged at an inner side of the tower wall.

4. The wind turbine according to claim 1, wherein the toothed yaw ring is integrated in the yaw claw.

5. The wind turbine according to claim 1, wherein the wind turbine comprises one nacelle, and wherein the yaw system interconnects the tower and the nacelle.

6. The wind turbine according to claim 1, wherein the wind turbine comprises at least two nacelles, and wherein the yaw system interconnects the tower and a load carrying structure carrying the at least two nacelles.

7. The wind turbine according to claim 1, wherein the tower wall and a wall defined by the part forming part of or being connected to at least one nacelle are arranged at substantially coinciding radial positions.

8. The wind turbine according to claim 1, wherein the toothed yaw ring is formed from two or more yaw ring segments.

9. The wind turbine according to claim 1, wherein the upper radially extending part or the lower radially extending part of the yaw claw forms an interface between the tower and the part forming part of or being connected to at least one nacelle.

10. The wind turbine according to claim 1, wherein a first axial sliding surface of the bearing connection and a second axial sliding surface of the bearing connection are arranged at substantially coinciding radial positions, and at opposite sides of the flange arranged in the space defined by the yaw claw.

11. The wind turbine according to claim 1, wherein the toothed yaw ring is a separate part mounted to the yaw claw.

12. A wind turbine comprising a tower with a tower wall and having at least one nacelle mounted thereon, and a yaw system interconnecting the tower and at least one nacelle, the yaw system comprising:
   a yaw claw being fixedly connected to the tower or to a part forming part of or being connected to at least one nacelle, the yaw claw comprising an upper radially extending part, a lower radially extending part and an axially extending part interconnecting the upper radially extending part and the lower radially extending part, thereby defining a space delimited by the upper radially extending part, the lower radially extending part and the axially extending part, with an open end arranged opposite the axially extending part;
   a sliding bearing connection comprising at least two axial sliding surfaces and at least one radial sliding surface arranged between the yaw claw and a flange arranged in the space defined by the yaw claw, the flange forming part of the part forming part of or being connected to at least one nacelle, or the flange forming part of the tower;
   a toothed yaw ring; and
   at least one yaw drive comprising a toothed gear arranged in meshing connection with the toothed yaw ring,
   wherein the axially extending part of the yaw claw and the meshing connection between the toothed gear and the toothed yaw ring are arranged at the same side of the tower wall, and
   wherein the space defined by the yaw claw is sized for a single flange, and wherein each of the at least two axial sliding surfaces and the at least one radial sliding surface engages the single flange.

13. The wind turbine according to claim 12, wherein the sliding bearing connection and the meshing connection between the toothed gear and the toothed yaw ring are arranged at axial levels being displaced relative to each other.

14. The wind turbine according to claim 12, wherein the axially extending part of the yaw claw and the meshing connection between the toothed gear and the toothed yaw ring are arranged at an inner side of the tower wall.

15. The wind turbine according to claim 12, wherein the toothed yaw ring is integrated in the yaw claw.

16. The wind turbine according to claim 12, wherein the wind turbine comprises one nacelle, and wherein the yaw system interconnects the tower and the nacelle.

17. The wind turbine according to claim 12, wherein the wind turbine comprises at least two nacelles, and wherein the yaw system interconnects the tower and a load carrying structure carrying the at least two nacelles.

18. The wind turbine according to claim 12, wherein the tower wall and a wall defined by the part forming part of or being connected to at least one nacelle are arranged at substantially coinciding radial positions.

19. The wind turbine according to claim 12, wherein the toothed yaw ring is formed from two or more yaw ring segments.

20. The wind turbine according to claim 12, wherein the upper radially extending part or the lower radially extending part of the yaw claw forms an interface between the tower and the part forming part of or being connected to at least one nacelle.

21. The wind turbine according to claim 12, wherein a first axial sliding surface of the bearing connection and a second axial sliding surface of the bearing connection are arranged at substantially coinciding radial positions, and at opposite sides of the flange arranged in the space defined by the yaw claw.

22. The wind turbine according to claim 12, wherein the toothed yaw ring is a separate part mounted to the yaw claw.

* * * * *